United States Patent
Roosen et al.

(10) Patent No.: US 6,872,015 B2
(45) Date of Patent: Mar. 29, 2005

(54) COORDINATED CONCURRENT PRINTING OF PRINT JOBS

(75) Inventors: Monica Maria Wilhelmina Mathea Roosen, Venlo (NL); Robertus Cornelis Willibrordus Theodorus Maria Van Den Tillaart, Gemert (NL); Duncan Antoon Helena Stiphout, Eindhoven (NL)

(73) Assignee: Oce-Technologies B.V., Venlo (NL)

( * ) Notice: Subject to any disclaimer, the term of this patent is extended or adjusted under 35 U.S.C. 154(b) by 19 days.

(21) Appl. No.: 10/649,867

(22) Filed: Aug. 28, 2003

(65) Prior Publication Data

US 2004/0126167 A1 Jul. 1, 2004

(30) Foreign Application Priority Data

Aug. 28, 2002 (EP) ............................................. 02078843

(51) Int. Cl.⁷ ................................................. B41J 5/30
(52) U.S. Cl. ........................... 400/61; 400/62; 358/1.15; 358/1.9
(58) Field of Search .............................. 400/61, 62, 70, 400/76; 358/1.1, 1.13, 1.9

(56) References Cited

U.S. PATENT DOCUMENTS

| | | | |
|---|---|---|---|
| 5,287,194 A | 2/1994 | Lobiondo | ................... 358/296 |
| 5,995,721 A | 11/1999 | Rourke et al. | ............. 358/1.15 |
| 6,498,656 B1 * | 12/2002 | Mastie et al. | ............... 358/1.15 |
| 6,606,165 B1 * | 8/2003 | Barry et al. | .................. 358/1.9 |
| 2001/0038462 A1 | 11/2001 | Teeuwen et al. | ........... 358/1.15 |
| 2002/0048476 A1 * | 4/2002 | Kato | ............................ 400/70 |
| 2002/0186384 A1 * | 12/2002 | Winston et al. | ............... 358/1.5 |
| 2003/0231329 A1 * | 12/2003 | Edmonds et al. | .......... 358/1.13 |

FOREIGN PATENT DOCUMENTS

EP    1 229 724 A2    7/2002

\* cited by examiner

*Primary Examiner*—Minh Chau
(74) *Attorney, Agent, or Firm*—Birch, Stewart, Kolasch & Birch, LLP

(57) ABSTRACT

A method, apparatus and program for distributed printing of digital print files in a network system including a print service and a plurality of printers adapted for interactive printing are provided. An interactive printing involves printing a print file only upon selection thereof and entering a print command through the local user interface of the printer. In a first step of the method, the print service receives a print file, stores it and distributes information on the stored print file to a plurality of the printers. In a second step, a print process for the print file is started, locally or remotely, in one of the printers and, while this print process is active, a print process for the same print file is started locally in one or more of the other printers. During the printing, the print service controls the printers to print together the required number of copies.

21 Claims, 13 Drawing Sheets

COORDINATED CONCURRENT PRINTING OF PRINT JOBS

This application claims, under 35 U.S.C. § 119, the priority benefit of European Patent Application No. 02078843.6 filed Aug. 28, 2002, the entire contents of which are herein fully incorporated by reference.

BACKGROUND OF THE INVENTION

1. Field of the Invention

The invention generally relates to distributed printing, wherein a plurality of printers concurrently process one print job in order to produce a requested number of copies of a document in a limited time interval. The invention also relates to a printing system in which the method according to the invention is implemented, and to computer software making a computer perform the method of the invention.

2. Discussion of Background Art

Distributed printing is for instance disclosed in U.S. Pat. No. 5,287,194, describing a system including a plurality of printers and a scheduler. In order to have a print job processed within a desired time interval, the print scheduler determines the job length and inspects the available printers. It selects the printer most suited for the job, and then checks if that printer can complete the job in time. If not, it selects another printer to take over the portion of the job the first printer cannot complete in time. In this way a job may be broken up in several portions each processed by another printer. U.S. Pat. No. 5,995,721 improves this scheduling method by giving an operator the opportunity to interfere with the scheduling process and reject certain printers that he does not want to process the print job, for instance, because such printers are too far away from his own location.

Generally, known distributed printing systems are centrally controlled by a scheduler that splits print jobs in portions and sends them to plural printers.

Another approach of quickly printing a number of copies of a print file involves concurrent printing in a so-called unchained interactive printing system as is disclosed in European Patent Application Publication No. EP 1 229 724 A2 owned by the present Assignee. In this particular form of printing, print files are submitted for printing, but never printed unless they are selected and started at the console of a printer by an operator. In a networked system comprising a plurality of printers, print jobs are made available for selection and subsequent printing at any of the connected printers. A print job remains selectable until it is specifically removed from the selection list, and can even be selected and started at one printer while it is being processed at another printer. In this way, several printers may be teamed up to print a large number of copies of the print file.

This solution differs from the methods described above in that the printing is not centrally controlled, i.e. the initiative to include a printer into the process is taken at the printer by an operator, and the print job is pulled from its source in the network by the printer instead of being pushed to the printers by the scheduler. An advantage of this approach is that printers may join the print process at different moments. If, for instance, a printer cannot handle the print job because of a remediable disablement, such as an empty print sheet tray or a paper jam, it may be restored to function and then be brought into the production process that is already running at other printers. This gives a great deal of flexibility.

A drawback of this approach, however, is that the operator, going from one printer to another, starting the same print job, must specify the number of copies to be made by each printer in order to arrive at the desired total number of copies. Also, when one of the printers suffers a malfunction during the processing, such as running out of print sheets, the desired number of copies will not be completed until the malfunction is remedied.

SUMMARY OF THE INVENTION

It is an object of the present invention to improve the method of unchained interactive printing in such a way that the advantages of such form of printing are kept, while its drawbacks are solved.

In accordance with an aspect of the invention, a method of printing digital print files in a network system including a print service and a plurality of printers, wherein a digital print file includes print image data and metadata specifying job information such as required number of copies to be printed, and wherein a printer is provided with a local memory and a local operator control unit with an inputting unit and a display and is adapted for permitting interactive printing, includes a first step wherein the print service receives print files, stores them in a storage and distributes information on the stored print files, including metadata, to a plurality of the printers; and a second step of starting a print process for a first print file in one of the printers and, while the print process is active, starting an interactive print process for the first print file in another one of the printers, wherein the print service controls the printers processing the first print file to together print a total number of copies of the first print file, which is equal to the required number of copies specified in the metadata of the print file.

According to an aspect of the invention, the print service now keeps track of the progress of the printers involved in the production process and, while leaving the initiative of printing copies of the print file to the printers, prevents the team of printers printing more than the requested number of copies. One advantage of this solution is that a malfunction of any of the involved printers is automatically compensated by the other printers taking over the share of the broken-down printer, without any interference of server or the operator.

In an embodiment of the invention, the printers printing a print file together report the finishing of each copy of the first print file to the print service and obtain permission from the print service for starting printing of each new copy of the first print file. The print service gives the permission with reference to the number of copies contained in the metadata of the first print file. This is an advantageous way of keeping a firm control of the process and yet leave the initiative to the individual printers.

The print service may be implemented as a server connected to the network, but it may also be implemented as a distributed print service process in a system wherein each connected printer is provided with a server process that is logically connected to the server processes in the other printers.

In a further embodiment of the invention, a print file for coordinated concurrent processing in at least two printers, also referred to herein as a tandem job, includes a metadata item identifying it as such. When such a print job is started at one of the printers, the print service automatically undertakes to coordinate the printing processes at the printers.

In another embodiment of the invention, a print file is not designated as such, but the operator starting a print job may indicate at that moment that the job is to be handled as a tandem job. Upon such indication, the print service further coordinates the production process.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Other embodiments and advantages of the invention will be explained hereinafter by reference to the appended drawings, in which like reference numbers designate corresponding elements. In the drawings, FIG. 1 shows a general outline of a network system including a plurality of workstations and printers and a print server according to an embodiment of the invention;

DETAILED DESCRIPTION OF THE PREFERRED EMBODIMENTS

Figure 1:
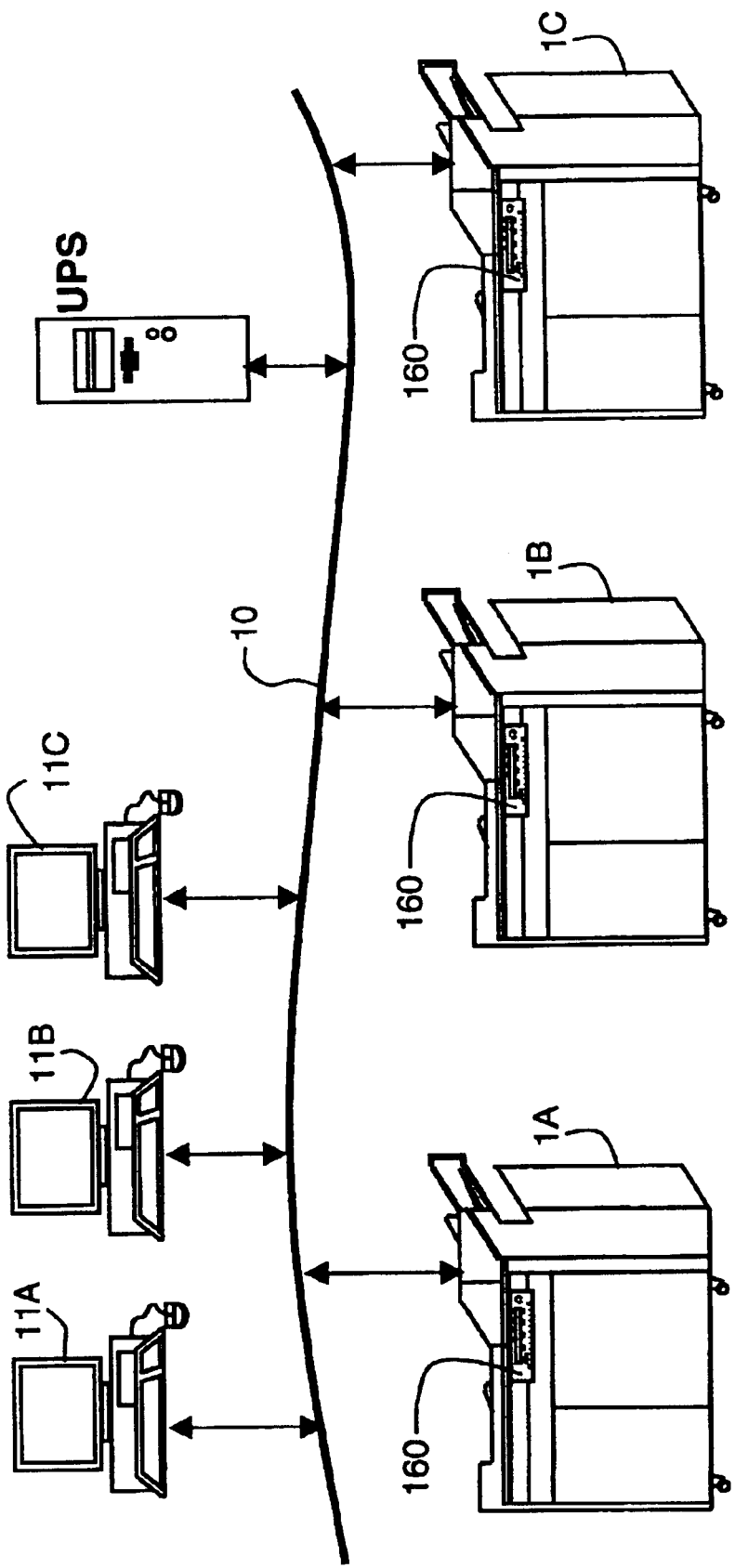

FIG. 1 shows a general outline of a network system including a plurality of workstations 11A, 11B, 11C and a plurality of printers 1A, 1B, 1C, and a print server UPS, all operatively connected to a network 10.

The printers 1A, 1B, 1C are each equipped with an operator control panel 160 for operation, that is provided with a display and keys and is connected to an operator control unit of the printer. The printers 1A, 1B, 1C may be embodied as digital copiers, as is the case in this example, but also as other types of printers properly provided with a suitable operator control unit and a control panel.

In the following description, the terms "print file" and "print job" are used indifferently. They are meant to relate to the same entity, although stressing different aspects of it, namely the data file aspect and the administrational aspect, respectively.

Within the concept of the present invention, digital data files which are sent to any of the devices 1A, 1B, 1C via the network 10 for printing, are either of a first type or of a second type. Files of the first type are required to be printed directly, i.e. without further action on the part of an operator at the printer, while files of the second type are required only to be stored in the memory of the printer and not to be printed until an operator explicitly so requests at the printer by selecting one via the operator control panel. The type of file involved is apparent from an attribute added to the file.

Processing of a data file of the first type is referred to in this description as automatic printing (AP). Processing of a data file of the second type is referred to as "interactive printing" (IP).

While AP print jobs are submitted to a particular printer and are in principle handled by that printer, IP print jobs are automatically shared by all printers or a predefined group thereof, and are made available for selection and processing at any of these devices such that a user may freely choose one of the printers for printing his print jobs. This will hereinafter be called "unchained-printing". The concepts of interactive printing and unchained printing are described extensively in copending European Patent Application No. 1 229 724.

Generally, the concept of "unchained printing" includes a server function and a print data storage function, each of which may be implemented in one of several ways and in different physical locations in the system, to be described below.

The process of the server function and the print data storage function is as follows.

A print file submitted by a workstation is received by the server function. The server function stores the print data in an associated storage and extracts identification data of the print file. (The identification data may include, but is not limited to, the name of the user, the name of the file, the time of arrival of the print file in the system and the print settings such as the required number of copies.) The identification data will be called "metadata". Then, the server function sends the metadata to all connected printers.

The printers all include the jobs in their administration systems and make them selectable for printing, even though they may not have the actual print data stored locally. When a user now selects a job at the console of one of the printers, that printer downloads the print data from the storage of the server function and prints the job.

After having printed the job, the printer sends a message to that effect to the server function, which instructs all printers to mark the print job as "printed" in their administration systems and selection lists. Marking a job as "printed" may be effected by displaying a mark (e.g., a "tick sign") next to the file name in the list. Other methods of indication may also be used.

When a print job is deleted by a user at the console of any of the printers, that printer sends a message to that effect to the server function, which deletes the print data of that job from storage and instructs all printers to delete the job metadata pertaining to the deleted print job from their administration systems. A "time-out" function may be included within the server function to automatically erase the print data of a print job from storage and to instruct the printers to delete that print job from their administration systems after a predetermined time interval since the time of arrival of the print file in the system.

Unchained-printing can be technically implemented in several ways according to the present invention. Three implementation examples are described below. Reference is made to FIG. 1.

In a first implementation, the UPS performs both the server function and the associated storage function. The UPS may be a PC having a high capacity hard disk. In this embodiment, the printer drivers in the workstations 11A, 11B, 11C are programmed to submit IP print jobs to the UPS. The UPS receives and stores all print files, extracts the metadata and sends the metadata to all connected printers. In operation, the dedicated printers 1A, 1B, 1C include the jobs in their administration systems and make them selectable for printing, although they have not stored the actual print data on their disks or storage. When a user now selects a job at the console of one of the printers, that printer downloads the corresponding print data from the UPS and prints the job.

In a second implementation, of which the hardware is similar to that of the first implementation, print files are submitted to a particular printer, at the choice of the user (or as programmed in his printer driver). Upon reception of the print file, the addressed printer stores the file internally, extracts the job metadata and sends them to the UPS, which fulfills the rest of the server function. Thus, the UPS transmits the metadata to the other printers. The other printers all include the jobs in their administration systems and make them selectable for printing. When a user now selects a job at the console of one of the printers, and the print data of that job are not stored locally in that printer, that printer downloads the corresponding print data from the addressed printer that has stored them and prints the job.

In a third implementation, the server function and the associated print data storage are fully distributed. Therefore, a physical server device is not needed. Print files are submitted to one of the printers in the very same way as described above. Upon reception of the print file, the addressed printer stores the file internally, extracts the metadata and sends them directly to the other printers. The other printers all include the jobs in their administration systems and make them selectable for printing. When a user now selects a job at the console of one of the printers, and the print data of that job are not stored locally in that printer, that printer downloads the print data from the addressed printer that has stored them and prints the job.

Figure 2:
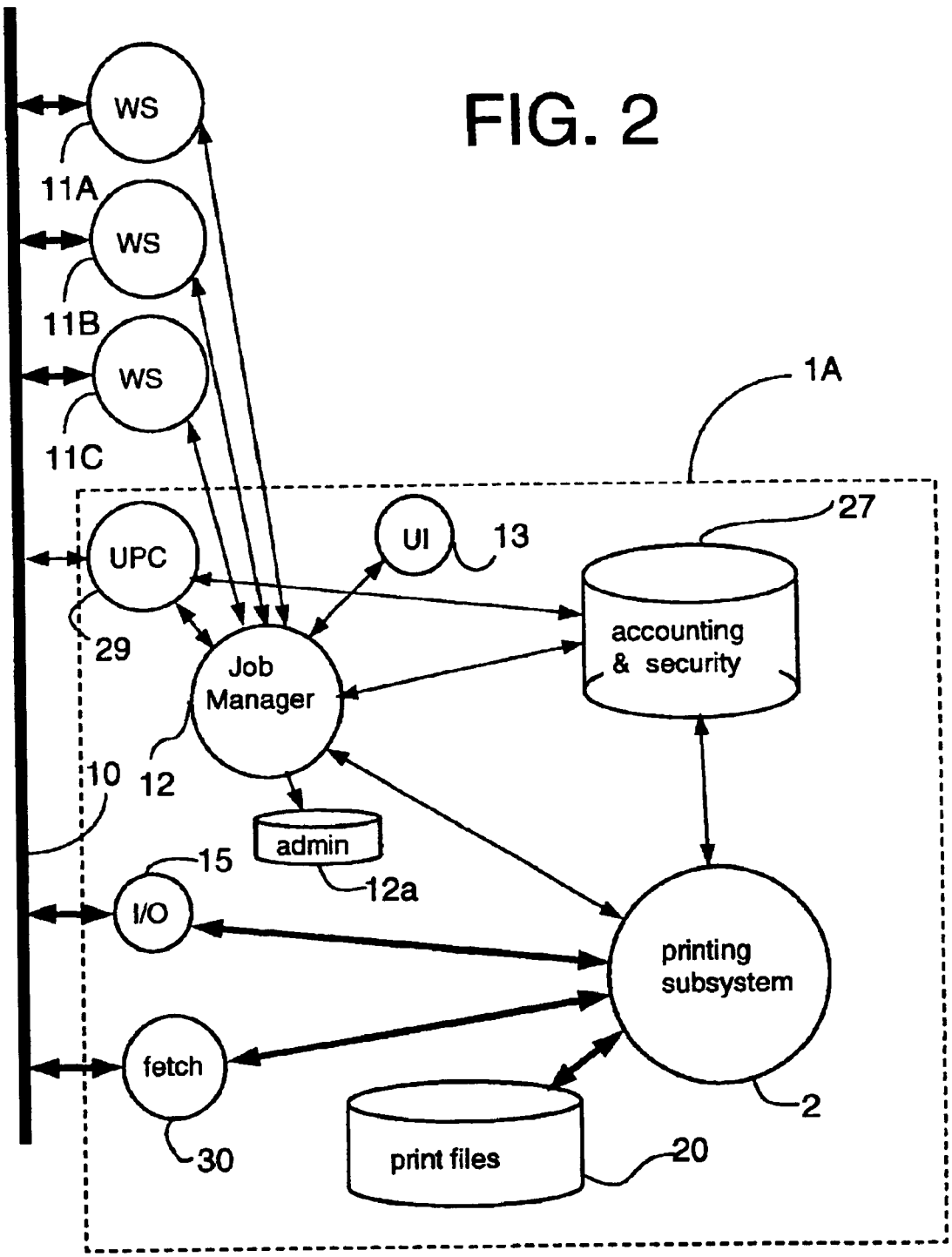
FIG. 2 is a diagram showing an exemplary printing device according to the present invention.

FIG. 2 is a diagram showing the constituent parts of an exemplary printing device, in this example a digital copier, for use with the present invention.

In this example, the device 1A (or 1B or 1C) comprises a printing subsystem 2 which contains known items such as a scanner, a printer, a memory, a dedicated control unit, etc.

Further, the device 1A also includes a number of units required to print digital image data which are fed via the local network 10, such as:
- a management unit 12, hereinafter referred to as the 'JobManager', which manages the processing processes and also maintains an administration system for all the copying, scanning and print jobs present,
- an administration system (database) 12a for jobs and maintained by the JobManager 12,
- an operator control unit 13, also termed as 'UserInterface' (UI), provided with an operator control panel 160 on the printer housing, with a display and keys for operation of the device 1A,
- an input/output (I/O) handler 15 for receiving and transmitting digital data via the network 10 from the digital environment,
- a storage unit 20 for storing print files and any other data as needed,
- an accounting and security unit 27, which inter alia manages the authorization of users and access codes,
- an Unchained-Printing Client (UPC) 29 connected between the JobManager 12 and the network 10 for communicating with the Unchained-Printing Server (UPS), and
- a fetch module 30 for fetching a print data file from the print data storage function, in this case another printer, via the network 10.

All these components are operatively coupled.

Figure 3:
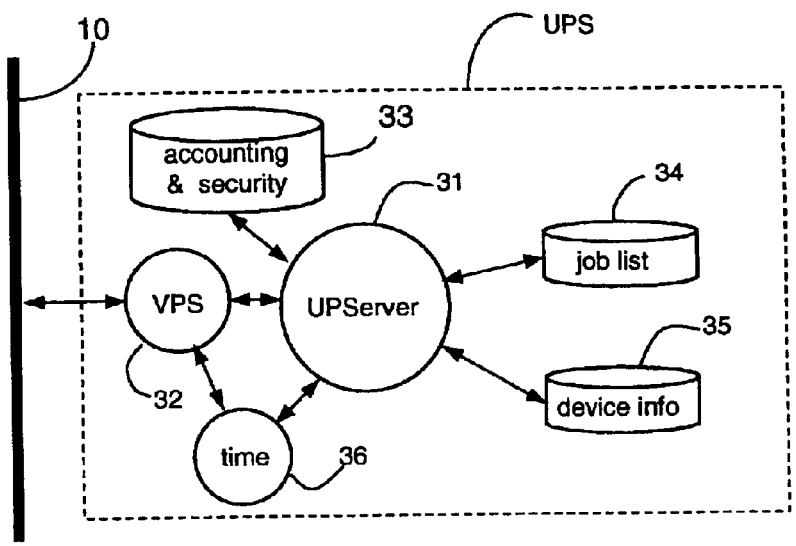
FIG. 3 is a diagram showing aspects of an unchained-printing server according to the present invention.

FIG. 3 is a diagram showing aspects of the Unchained-Printing Server UPS. The UPS includes a UPS module 31 which controls all processes, and a Virtual Printer Server (VPS) 32. The UPS module 31 maintains three databases, one database (33) including accounting and security information, a.o. permissions of users, one database (34) including the list of the metadata of all jobs in the system, and one database (35) including information on the printers connected. Further, the UPS includes a time server 36 for synchronizing the workstations, the printers and the UPS, e.g. by using the well-known SNTP protocol. All the components of the UPS are operatively coupled.

The Virtual Printer Server (VPS) 32 of the UPS manages the communication between the printers and the UPS module 31. It exchanges messages with the printers when an event occurs at a printer, such as receiving, starting, finishing a print job, malfunctions, etc. Further, the VPS 32 senses when a printer goes down, and a printer comes up.

The accounting and security database 33 of the UPS and those (27) of the printers are synchronized in order to assure that they contain the same information. Any changes in permissions and credits are entered by the system administrator in the database 33 of the UPS and are then automatically distributed by the UPS to the corresponding databases in the printers. Also, when a print file of a yet unknown user arrives at a printer, and the JobManager 12 of that printer extracts the user name and updates its accounting and security database 27, the JobManager 12 of that printer also informs the UPS of the same information, which then updates its database 33 accordingly and informs the other printers.

Figure 4:
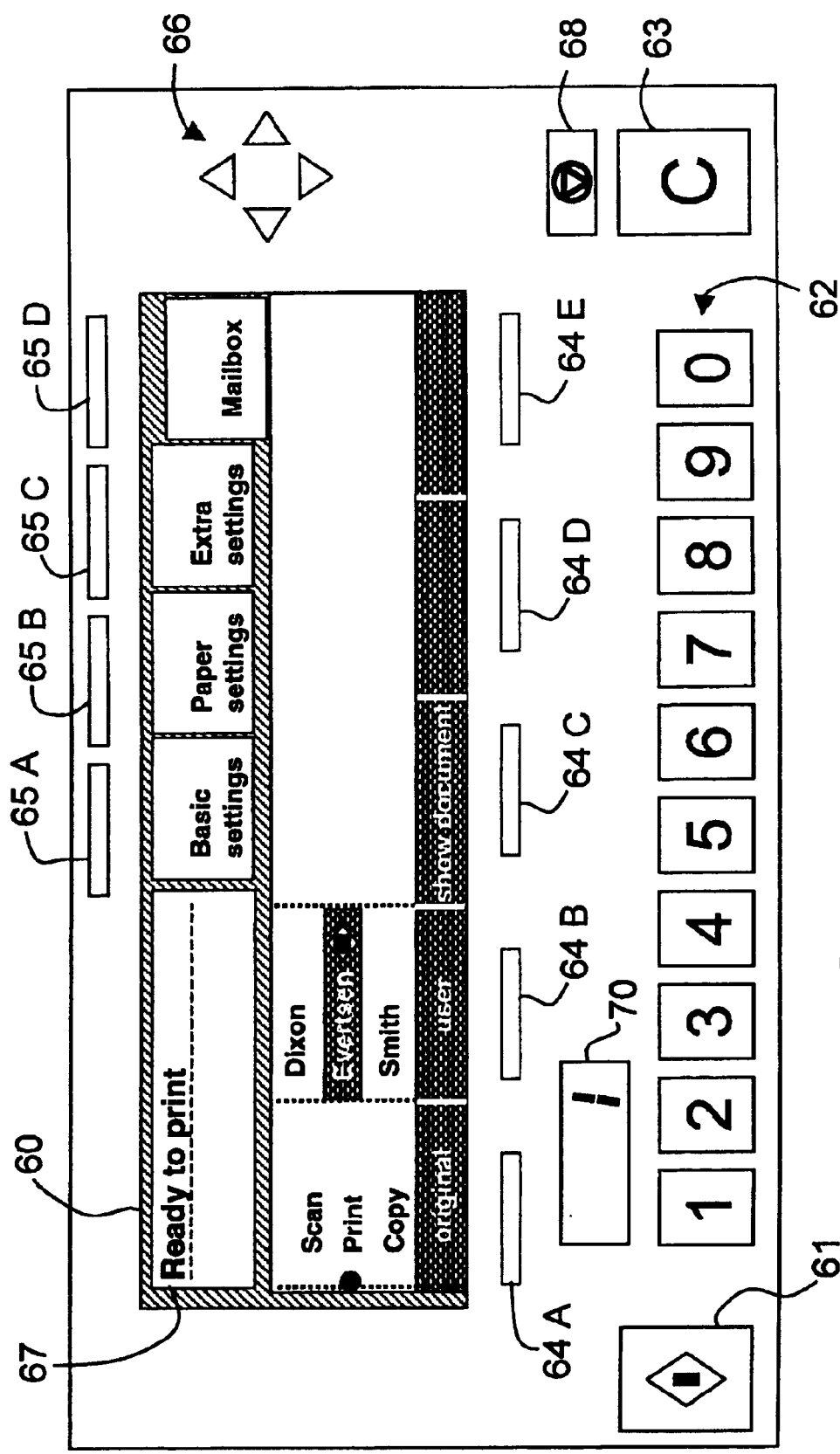
FIGS. 4, 5, 7–10, 12 and 13 show an operator control panel of a printer with a display image in various situations according to the present invention.

An example of the operator control panel 160 belonging to the operator control unit 13 of a printer is shown in FIG. 4 and includes a display screen 60 such as an LCD display, and a number of keys, namely a start key 61, number keys 62, a correction key 63, a stop key 68, selection keys 64A–64E, 65A–65D and the key cluster 66. All these elements are operatively connected to the operator control unit 13, which in response to the operation of the keys, passes signals to the JobManager 12 and which also controls the display screen 60 to display options and messages to the operator.

The selection keys 64A–64E are for selecting device functions, which are grouped in sets that can themselves be selected by the keys 65A–65D. Captions below the keys 65A–65D specify the sets, e.g., "Basic settings" such as simplex or duplex, staple, enlargement, "Paper settings" for selecting print sheet properties, and "Extra settings" such as lighter/darker, margin shift, etc. For each function group, a list of alternative settings for a function is shown for selection in a column above each key 64A–64E. By actuating a selection key, an operator can choose a different setting, e.g. in accordance with a cyclic pattern. The leftmost column is dedicated to the basic device function, e.g., "Copy", "Print", or "Scan". The operator control panel 160 also contains a number display 70 to indicate the number of copies set.

The procedure for handling print files of the second type (for interactive printing) will now be described. This description is applicable to the second embodiment (second implementation) mentioned above (print files submitted to and stored in one of the printers, and metadata distributed via a UPS), except as indicated otherwise. One skilled person will have no difficulty in devising the modifications necessary for the other implementations.

The JobManager 12 of a printer maintains the administration system 12a in which the identification data of all the data files for printing stored in the storage unit 20 are entered. When a new file is received via the network 10, then the JobManager 12 extracts the identification data (metadata) thereof and enters them in the administration system 12a in connection with the name of the owner/sender. Further, the JobManager 12 passes the metadata of the print file and a code identifying the printer itself to the UPS via its UPC 29. Also, upon reception of metadata of other print jobs from the UPS, the JobManager 12 enters the same in its administration system 12a.

The UPS then receives the metadata of a newly received print file (AP or IP) via the Virtual Printer Server 32 and stores them in the job list 34. Then, the UPS sends the metadata and the device identifier code to the other dedicated printers (e.g., printer 1B) through the VPS 32. In this way, even a print file of the first type (AP) can also be printed by any of the other connected printers.

When an operator wants to have a specific data file of the second type printed, he must so instruct the printer via the operator control panel 160. First, he must select the function "Print" with key 64A. In reaction, the operator control unit 13 requests the JobManager 12 to pass a list of all the active user names (names of users having at least one print job of the second type in the system). As shown in FIG. 4, the operator control unit 13 displays the user list on the display, in the column above key 64B, whereafter the user can select his name from the displayed list. If the list is too long to be displayed completely, a part of it may be shown on the display and scrolling is possible using the star keys 66. Initially, the display focus is on the user who has last submitted a print job to the particular printer (in this example, "Evertsen").

It will be understood that the user list includes all users having sent jobs to any printer in the system, of which the metadata are known.

Figure 5:
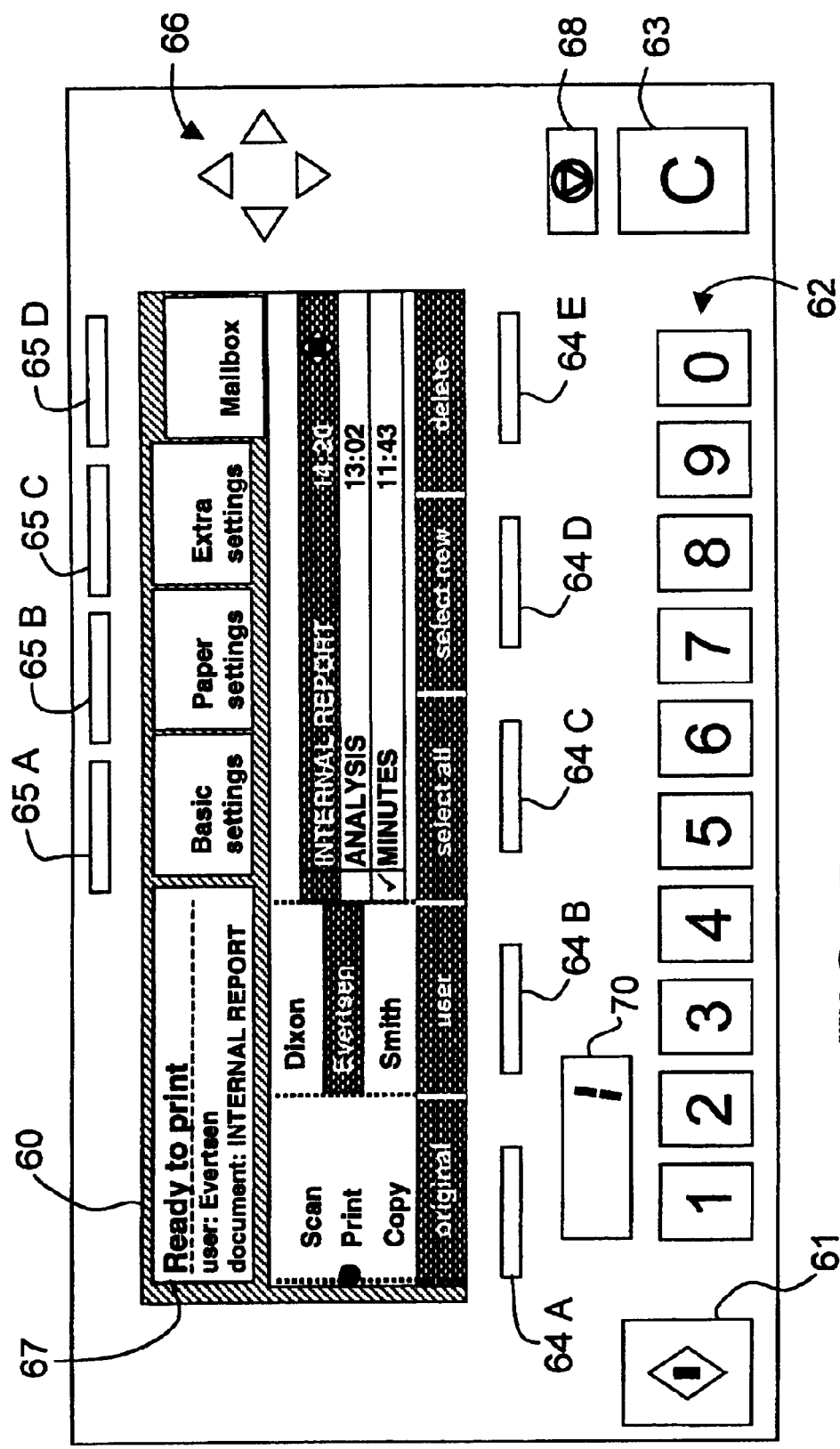

After the user has selected his name, he actuates key 64C to obtain an overview of his own print jobs. In response to this, the JobManager 12 makes up a current list of interactive and automatic print jobs of the current user and passes it through to the operator control unit 13, which displays this list to the user for selection on the display 60. An example of the display image is shown in FIG. 5. The submission time of each job is shown at the side of the file name. A "tick" sign is shown at the left of a file name of a file that has been printed already. If the list is too long to be displayed completely, a part of it is shown on the display and scrolling is possible using the star keys 66. Initially, the display focus is on the print job submitted last to the particular printer (in this example, "INTERNAL REPORT"). In this embodiment, the keys 64C–64E have functions for file management. Key 64C is for selecting all print jobs of the current user, key 64D is for selecting the newly-arrived print jobs only, and key 64E is for deleting any selected jobs.

In response to the selection of a print job, the corresponding print data file is brought out of the storage unit 20 (or fetched from another storage by the fetch module 30), converted to printable data and printed in the printing subsystem 2.

After the selection of a print job, the printing process is started by actuating the start key 61.

When a data file has been printed, it remains in principle stored in the storage unit 20 of the printer until it is removed by the user himself or the manager of the printer. To this end, he gives a command for removal of a selected file. In response to this, the JobManager 12 passes a command to delete the file from the storage unit 20 and it removes the identification data of that file from its administration system 12a. A "time-out" function may be provided to automatically delete a print file after a predetermined time interval.

Although unchained printing is primarily intended for interactive print jobs, automatic print jobs (AP jobs) may also be submitted. They are normally processed by the particular printer to which they have been submitted, unless that printer's JobManager is in the mode (which can be set by an operator having specific privileges) in which it does not accept automatic print jobs. In the latter case, it converts the print file into one of the second kind (IP), and further proceeds as described above.

A printer receiving an automatic print job also reports it to the UPS, which in turn informs the other printers. The other printers then make the job selectable for printing. After being printed, the AP jobs remain stored until they are deleted, either intentionally by a user or automatically.

When a print job has been started at one printer, it remains selectable at the other printers. The print job may even be started at other printers while it is still running at the first-mentioned printer where the print job has been started. This feature may be used in a reprograhic department, where several printers are placed for speedy production of documents in large numbers. In general, to profit from this inventive concept, a print file is submitted to an unchained printer server function in any of the technical implementations of unchained printing explained above, wherein the metadata include the number of copies to be printed. Then, an operator starts the print job at several connected printers without bothering about setting a number of copies. These printers parallelly print copies of the print file. The server function keeps track of the progress of the printing processes, and commands the printers to stop at the moment that the total number of copies printed by all involved printers reaches the required number of copies specified in the metadata.

A strong advantage of this concept is that any disturbances of a print process in an involved printer is automatically compensated by the other involved printers printing more copies. Thus, this procedure is very robust.

Following is a description of technical measures according to the invention for exploiting and facilitating the feature of parallelly finishing a print order by a plurality of printers, further to be called: tandem printing.

In a first embodiment, tandem printing is entirely implemented in the printer server function in any of the technical implementations of unchained printing explained above. It is thus not necessary to define a print job as a tandem job at the submission site (workstation). A normal print job is submitted to the server function, which makes the print job selectable at all or at least a plurality of the available printers. Then, an operator selects and starts the print job at several of the printers, stating that he wants the job to be processed as a tandem job, i.e. one with the prespecified total number of copies. Alternatively, if the operator does not start the print job as a tandem job, processing at the different machines (printers) is completely independent and the set number of copies is printed at each printer. Also, the set number of copies may be changed at any of the printers (for that printer).

Figure 6:
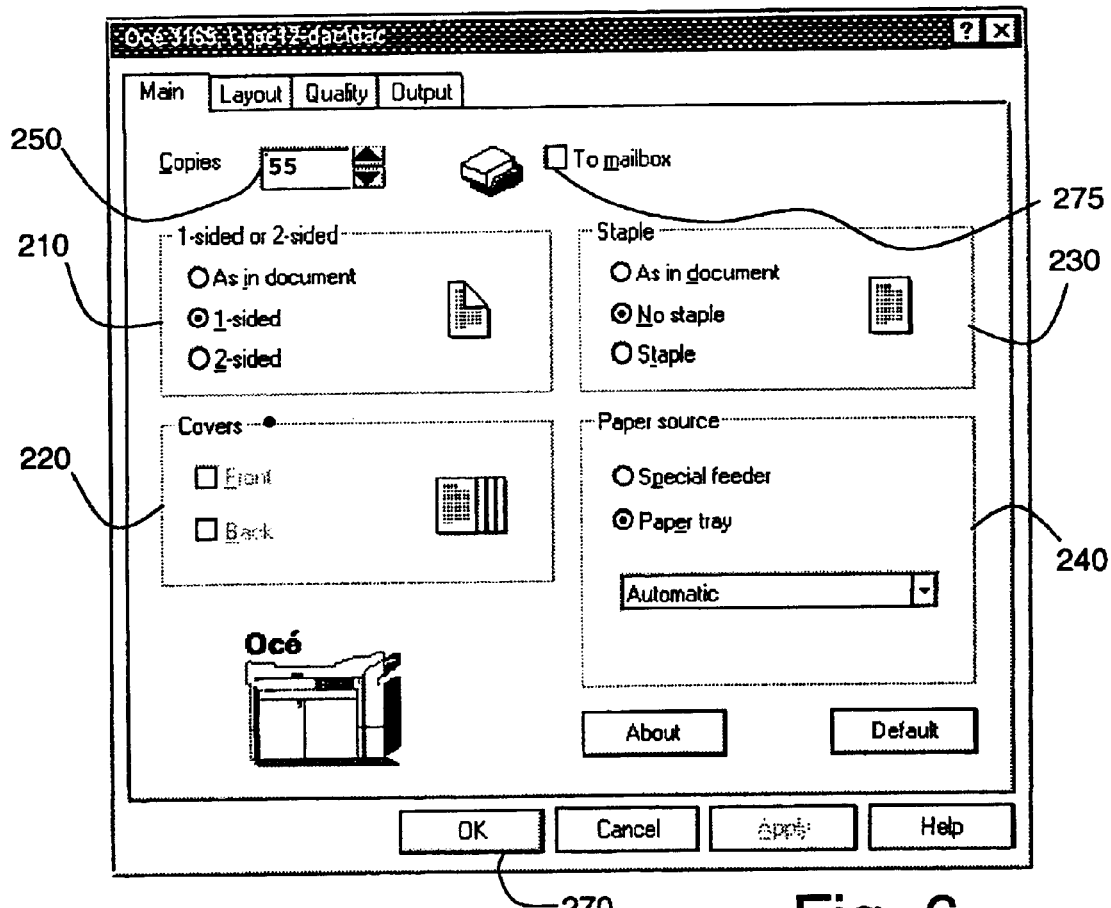
FIGS. 6 and 11 show examples of an order window of a printer driver in a workstation according to the present invention.

FIG. 6 shows an example of an order window of a printer driver in a workstation 11A–11C. A printer driver is a program for submitting print jobs to a printer. The order window pops up on the workstation display screen when the user clicks on a "Print" symbol in an application window on the screen, and the user can now enter specifications for the print job into the order window, such as the required number of copies, single or double sided printing, etc.

The order window includes several boxes 210, 220, 230 and 240 with radio-buttons and tick boxes for setting the print specifications, and a number box 250 for identifying the required number of copies, presently having the value "55". A tick box 275 is for defining the print job as an interactive one (a print file of the second type). At the bottom of the order window there are a number of "soft" keys, including a key 270 ("OK") for starting the actual submission process.

Upon reception of the print file, the server function distributes the metadata of the job to the printers, which make the job available for selection at their local operating consoles, in the way described above.

Figure 7:
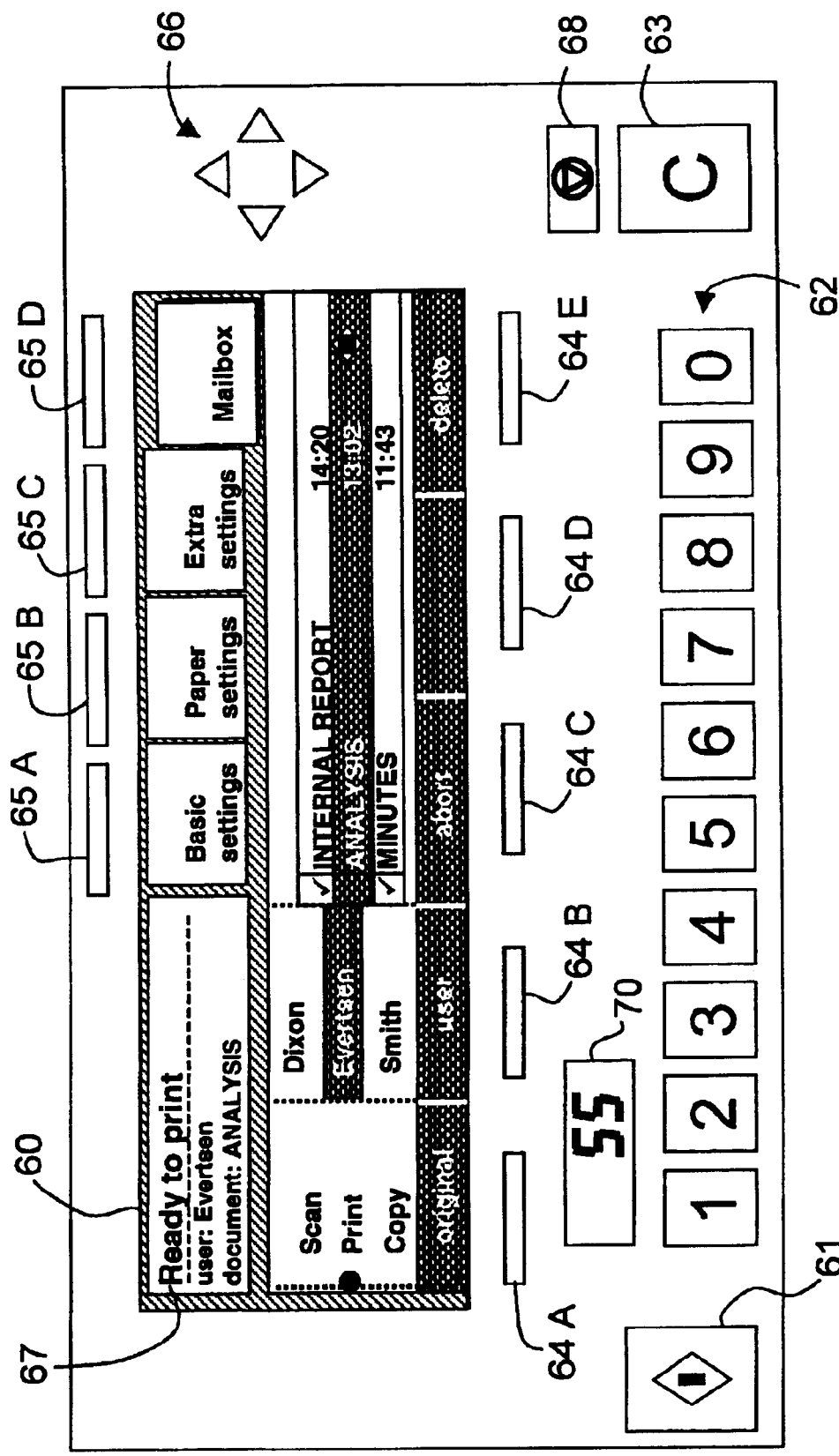

FIG. 7 depicts the operating panel of one of the printers, in which the relevant print job "ANALYSIS" is shown and has already been selected by an operator. The number display 70 shows the required number of copies programmed in the printer driver. The operator may now start the print job by actuating key 61. He may also change any of the settings of the print job before starting it. If, in this process, he changes the required number of copies, the JobManager 12 of the printer updates the metadata of the job with the new number and communicates the updated metadata to the server function. The server function then communicates the changes to the other printers.

Figure 8:
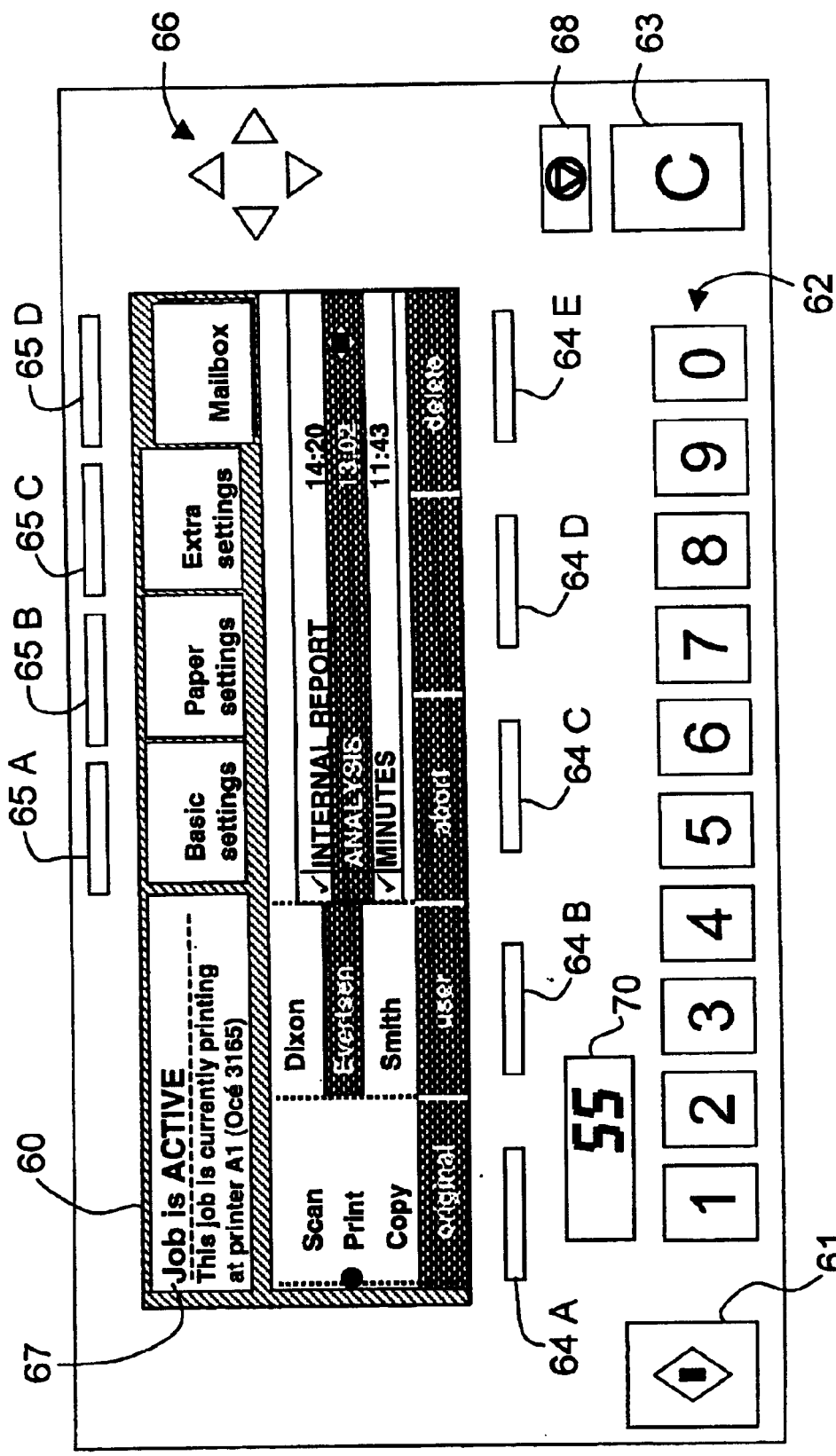

As described above, this print job remains selectable at the other printers and can still be started at the other printers as well. FIG. 8 shows the operating panel of a second, other printer, in which the same print job "ANALYSIS" has been selected. The message window 67 now shows a message stating that this job is already active (i.e., it is printing) in the first printer (here, e.g., at printer A1).

Figure 9:
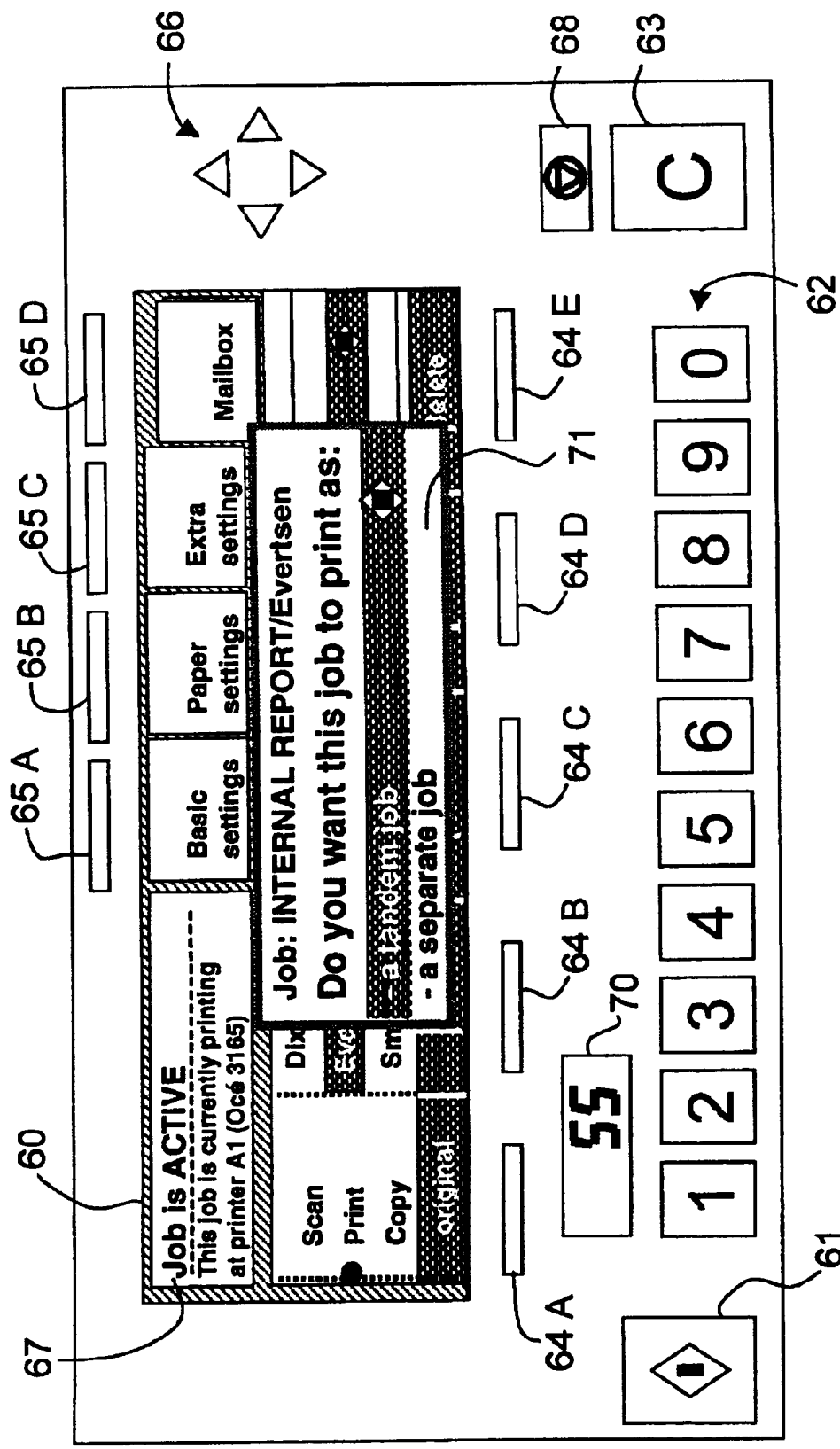

The operator now has two options, as is shown to him in a forced dialog window 71 that appears on the display screen 60 when he actuates the start key 61 (FIG. 9).

The first option is: starting the print job at the second printer independently from the first printer, in which case the job will entirely be printed according to the metadata, i.e., printing the 55 copies specified therein at the second printer. Also, the operator can now change the settings of the job, overruling the settings specified in the metadata. The changed settings are valid for the second printer only.

Figure 10:
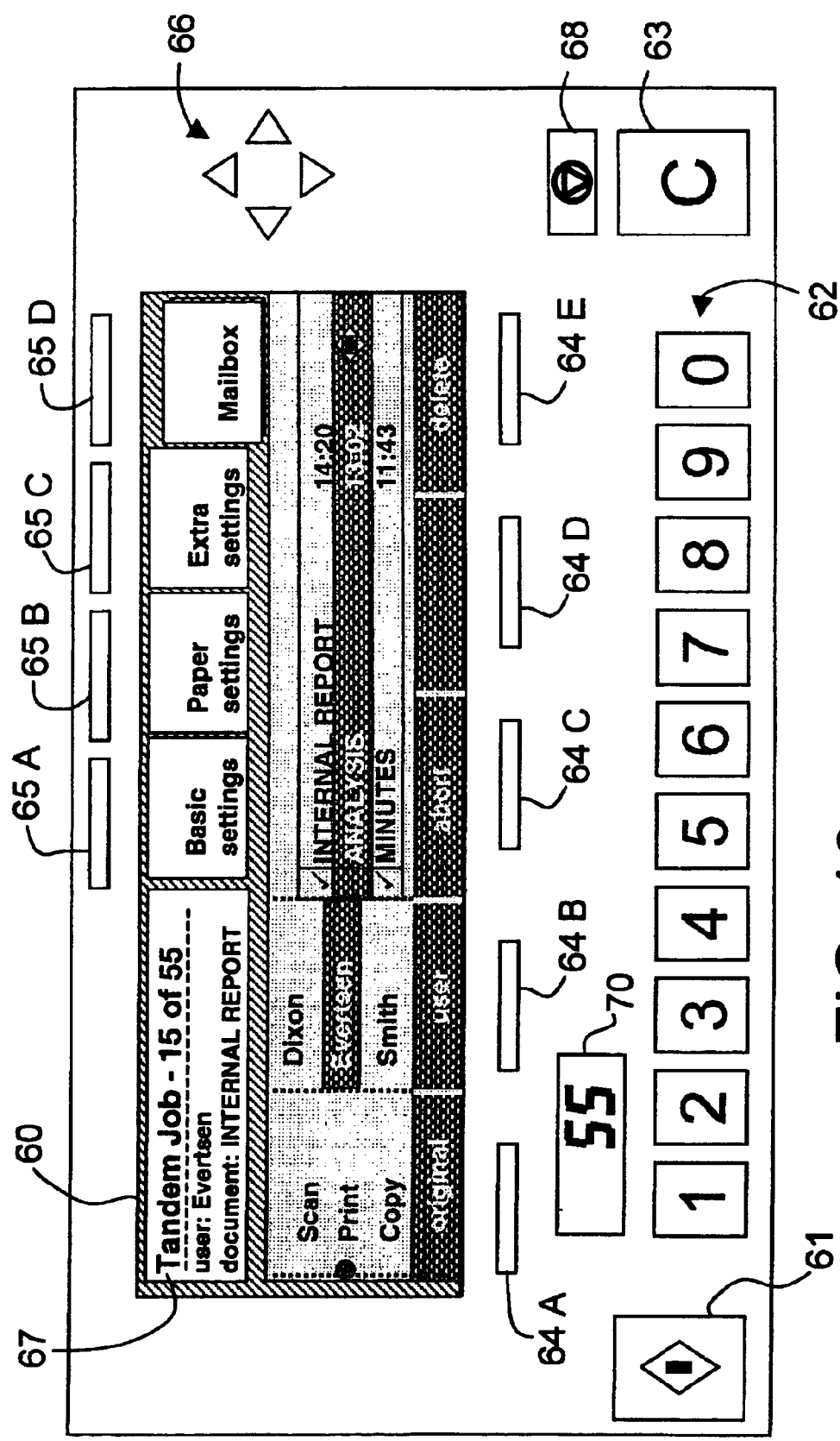

The second option is: starting the print job as a tandem job. In this case, the job is printed in dependence of the print process running at the first printer, and possibly other printers having joined the printing process, under coordination of the server function. FIG. 10 depicts the operating panel in a state of printing the job as a tandem job. The message window 67 now specifies the current copy being printed at that printer, which is a cumulative number for all printers involved in printing the job. In this situation, the print job is printed according to the metadata, which cannot be changed at the second printer. To make this clear, as an example, the settings part of the display 60 is grayed. However, the required number of copies may still be changed during the printing and at any of the printers involved. The procedure for adapting the printing management to a change of the required number of copies will be explained later in connection to FIG. 16.

A second embodiment of tandem printing will now be described. In this embodiment, a print job must be designated as a tandem job in the printer driver, and then the handling of the job is further performed by the printer server function. The second embodiment of tandem printing can be implemented into any of the technical implementations of unchained printing.

Figure 11:
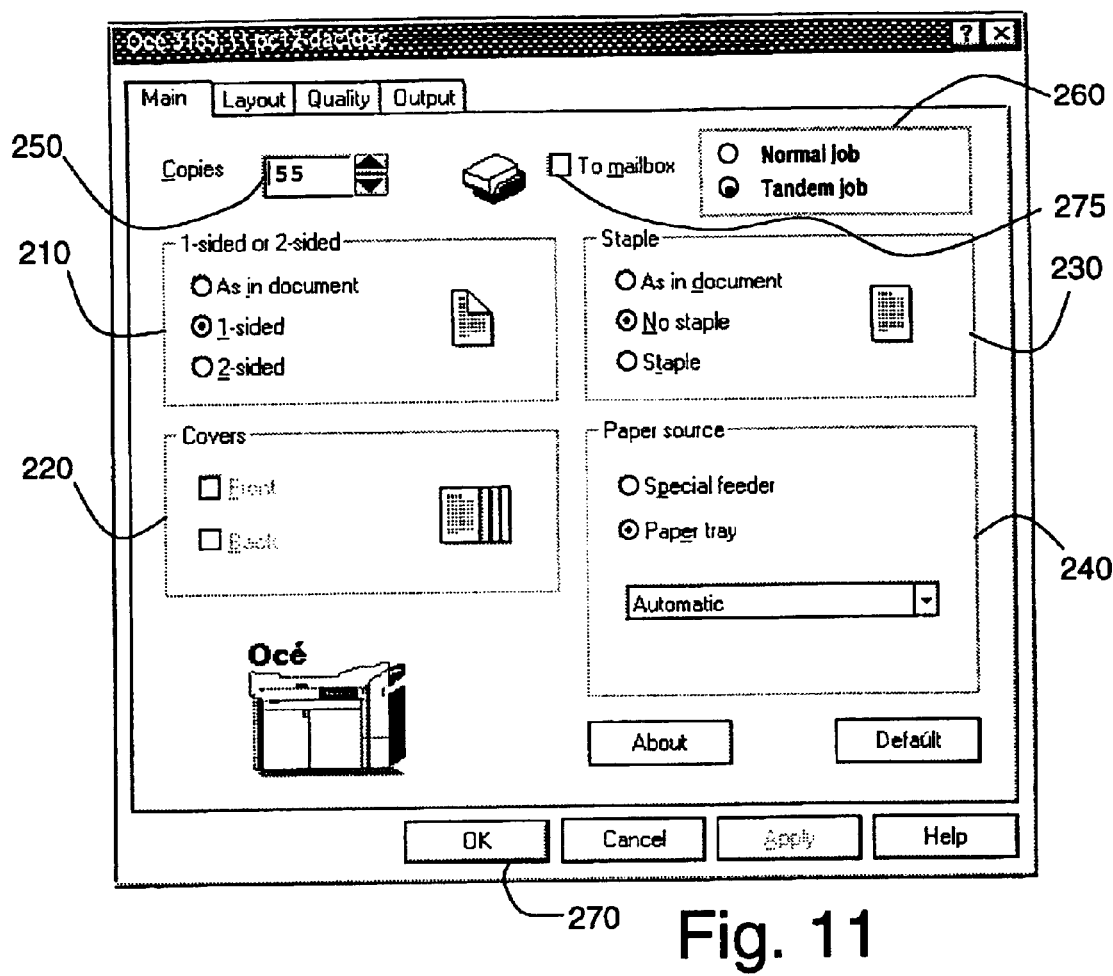

FIG. 11 shows an example of an order window of a printer driver according to this second embodiment of tandem printing mentioned above. In addition to the elements of the printer driver order window shown in FIG. 6, the window includes a box 260 with radio buttons in which the print job is defined as either a normal job or a tandem job. If the button "tandem job" is selected, the printer driver sets an appropriate flag in the print file data, that signals the job as such to the print server function.

Figure 12:
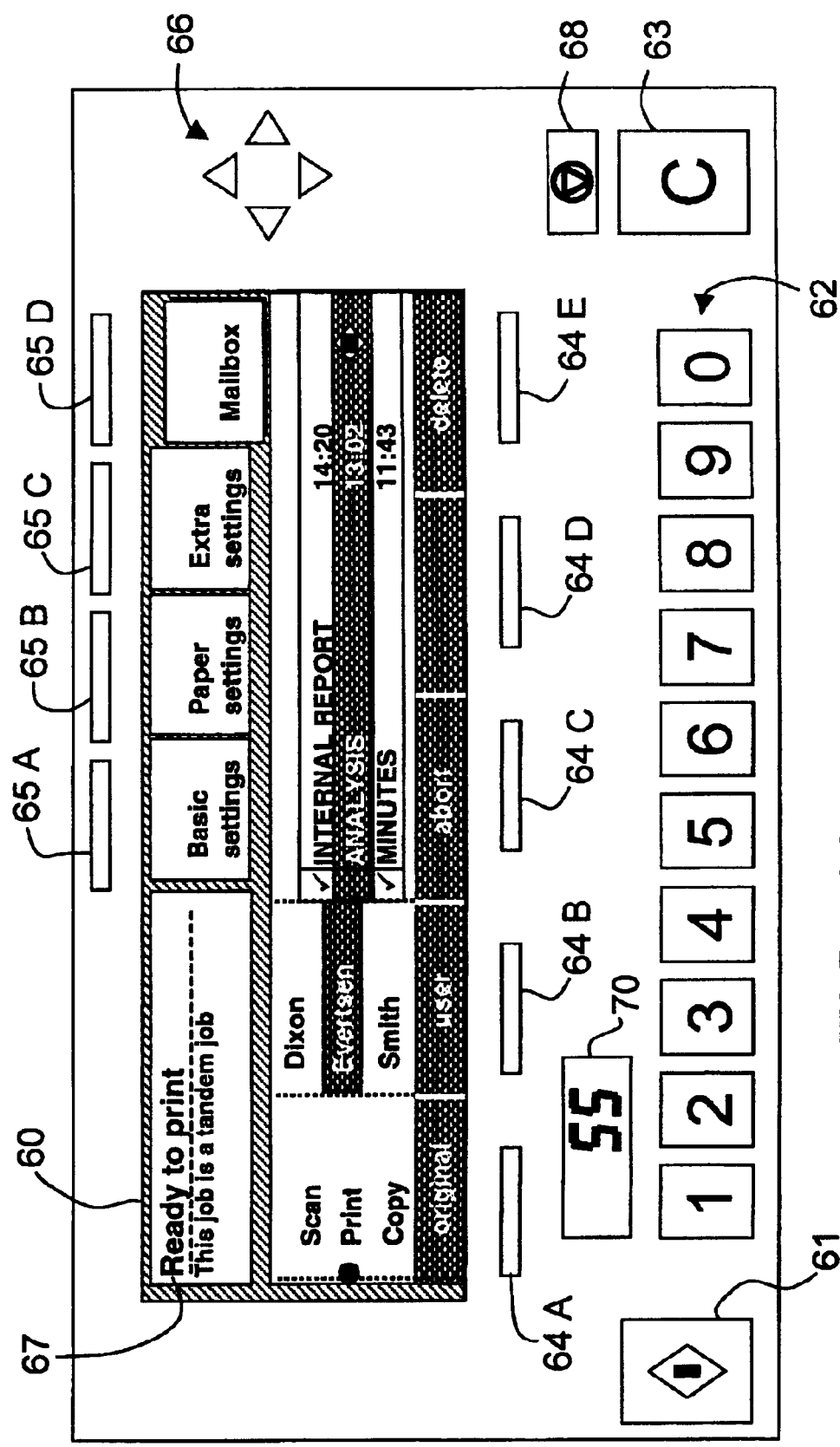
Figure 13:
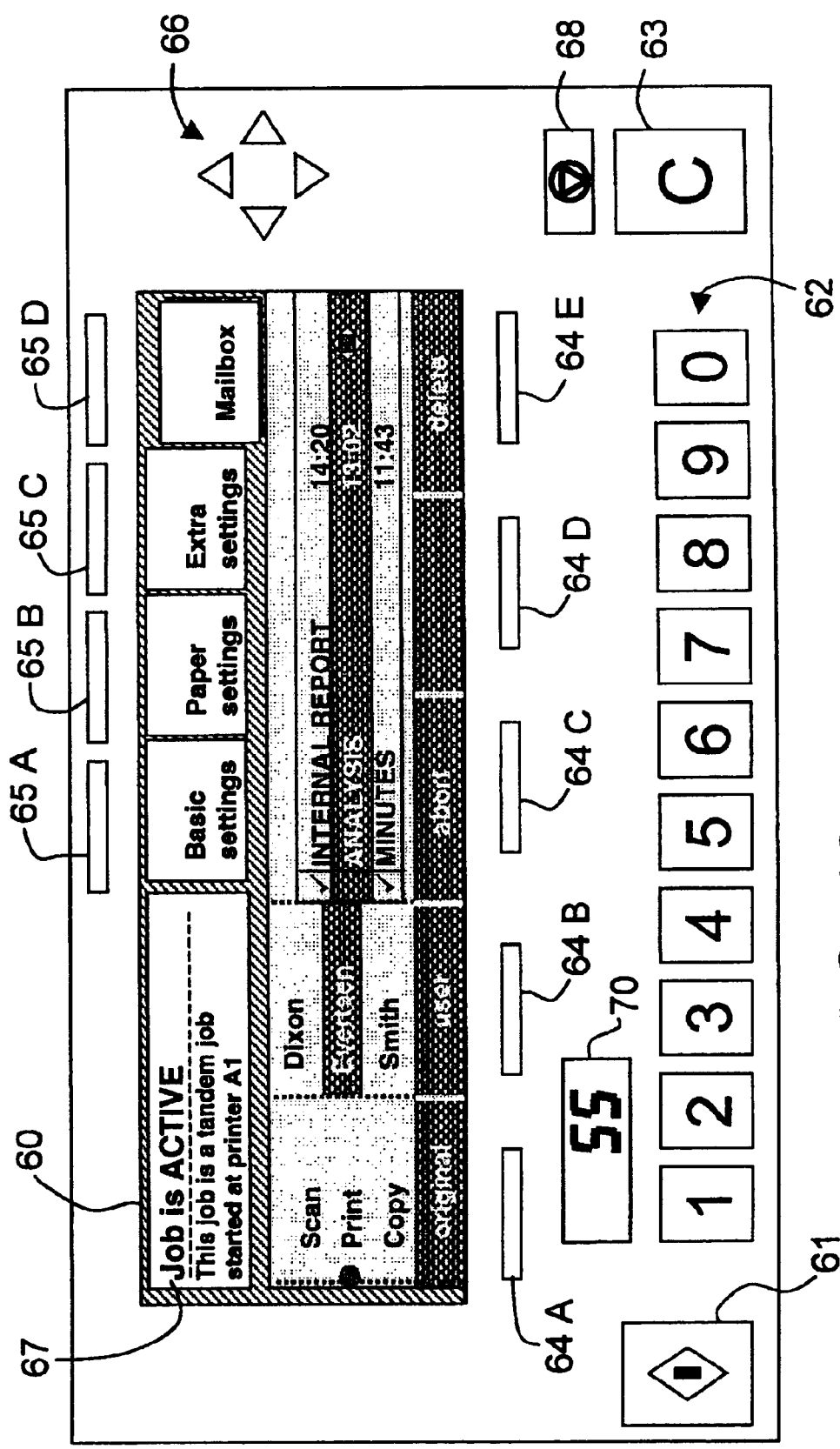

The server function distributes the metadata of a job of this kind to the printers, which make it selectable for printing. When an operator selects the job and the job has not yet been started at one of the other printers, he is presented with a display image at the printer as shown in FIG. 12, wherein the message window 67 states that this is a tandem job. The operator may now start printing the job by actuating the start button 61. Then, when an operator selects the same job at another printer, the display of that printer presents an image as shown in FIG. 13, which states that the job is already active and printing at the first machine (and any other machine printing the job). The operator may now start printing the job and join into the production of the required number of copies, but may not change the settings. To this effect, the settings part of the display image is grayed. However, the required number of copies may still be changed during the printing and at any of the printers involved. The procedure for adapting the printing management to a change of the required number of copies will be explained later in connection to FIG. 16.

In a variant of the above-described first embodiment of tandem printing, a job is designated as a tandem job on submission, but the forced dialogue 71 shown in FIG. 9 is now preset at the value "tandem job". This preset value may then be overruled by the operator selecting the "separate job" option.

In both embodiments of tandem printing described above, it may happen that a printer cannot print a print job that has been selected at its operating panel according to the specifications in the print file, e.g. because it cannot print duplex or because it has run out of staples. In that case, the printer will display a message saying so and advising the operator to resort to another printer that can print the job according to its specifications. A procedure for this is disclosed in European Patent Application EP-A 1 229 724 of the same Assignee, and may be implemented in the printer according to the present invention. In the case of the present invention, since print specifications cannot be altered for a tandem job, the operator may nevertheless start the print job at the printer that is unable to print according to the specifications, and then that printer will print the job "as well as possible".

It may happen that an operator wants to stop a running tandem print job immediately, either on the printer he is present at, or on all printers involved in printing the job. He may do so by pushing the correction key 63 on the control panel 160. In reaction, a forced dialogue appears on the display screen 60, asking if the operator wishes to stop the local print process in that printer only or those in all other involved printers as well, which he may indicate by again pushing the correction key 63 (local process) or pushing the stop key 68 (all printers). Obviously, this indication may be communicated in some other ways.

In the first case (local process), the printer cycles down and a new forced dialogue appears on the display screen 60, asking if the operator wishes to end the local print process in that printer, which he may acknowledge by actuating the stop key 68 or other designated key, or if he wishes to resume the print process, which he may acknowledge by actuating the start key 61 or other designated key. Before he actuates the start key 61, the operator may change the job settings, and in particular, he may change the total required number of copies to be made by all printers.

If, in the first forced dialogue, the stop key 68 was pushed, all involved printers cycle down and end their process.

Nevertheless, the print file is left in the local storage of the involved printers.

A computer program running in the JobManager 12 of a printer for communication with the server function during the production of a tandem print job is now described with reference to FIG. 14. This program is started when an operator of the printer starts a tandem print job at the operating panel of that printer (also when that tandem job is already running at another printer). The same program is started when an operator changes a normal print job into a tandem print job by joining in a second printer into the process. In that case, the program starts not only in the printer the operator is operating, but it also takes over in the printer that was printing the job as a normal print job. The last-mentioned normal print job may be an interactive print job, but also an automatic print job as described above.

Figure 14:
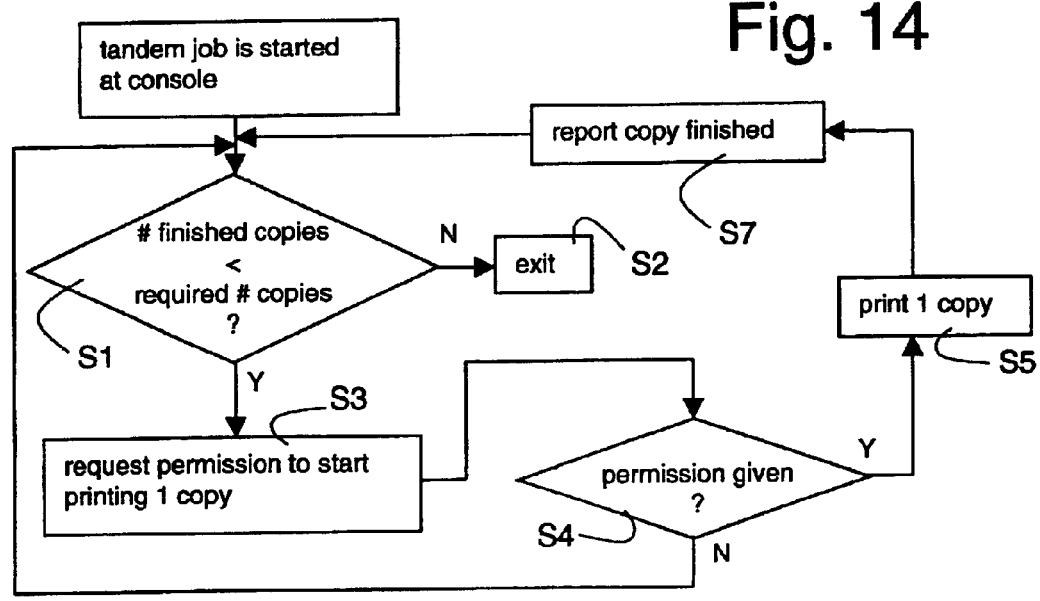
FIG. 14 is a flow diagram of a printer control program for a tandem print job according to the present invention.

Referring to FIG. 14, first (S1), the JobManager 12 of the printer checks if the total number of copies already finished within the group of involved printers (each printer reports finishing a copy of the print job to the community of printers, e.g. by broadcasting) is smaller than the required number of copies specified in the metadata of the job. If this is not the case, that printer does not start printing (S2). But if the number of finished copies is smaller, then the JobManager 12 requests the server function a permission to start printing one copy of the job (S3). If the server function gives a permission (S4), the printer prints one copy (S5), else, it returns to step S1. After finishing the copy, the JobManager 12 reports the printing result to the server function (S7) and returns to step S1. It will be understood that step S7 may be executed slightly before the copy is completely finished, e.g. while the last sheets are still being transported to the output tray, so that no time is lost with requesting a new permission.

Figure 15:
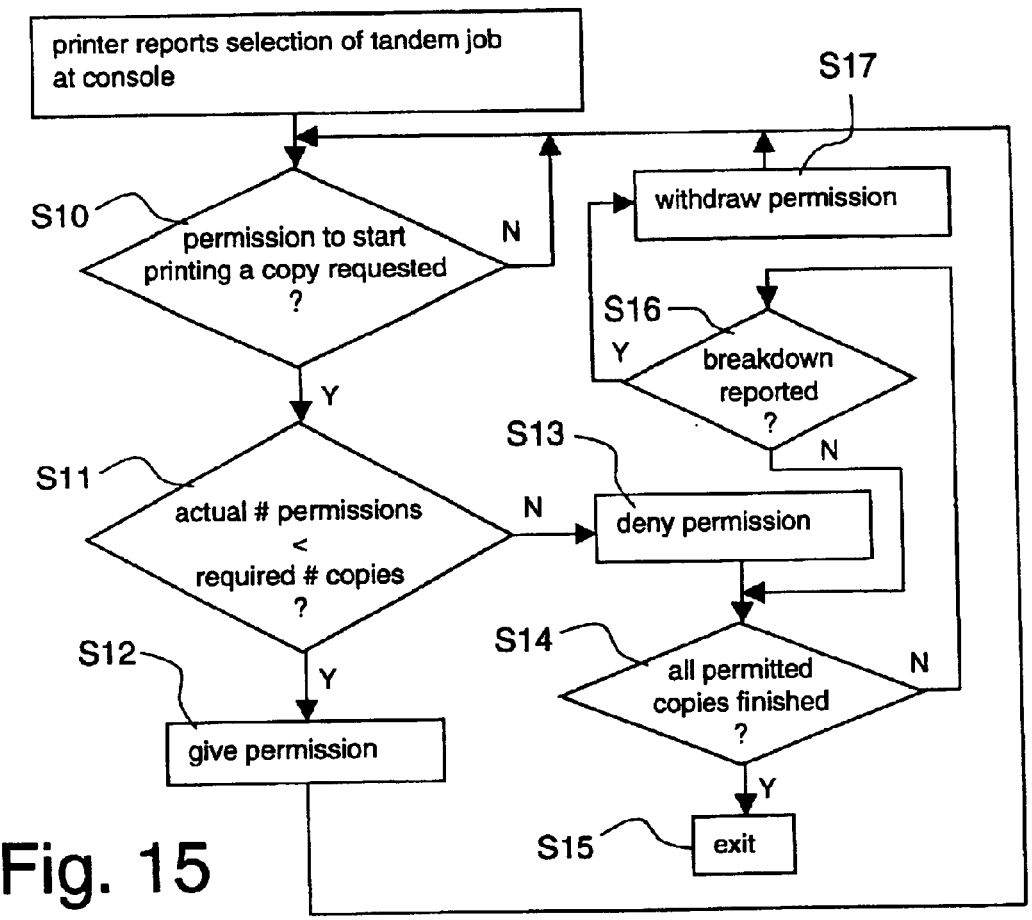
FIGS. 15 and 16 are flow diagrams of control programs in the server function for a tandem print job according to the present invention.

The computer program running in the server function for controlling the production of a tandem print job is now described with reference to FIG. 15. This program is started when a printer reports selection of a tandem print job at the operating panel of that printer (also when that tandem job is already running at another printer, and even also when an operator changes a normal print job into a tandem print job by joining in a second printer into the process).

The server function (e.g., at the UPS) waits for a printer to request a permission for starting the printing of one copy of the print job (S10). Then, the server function checks if the actual number of permissions given (also including the number of finished copies of that job printed without permission, in the case that the job was started as a normal job) is smaller than the required number of copies specified in the metadata (S11). It is to be understood that a permission remains valid, even if the associated copy has been printed. If the number of permissions is smaller, the server function gives a permission to print one copy to the requesting printer (S12). But if not (e.g., all required copies have been made or at least started), the server function denies the permission (S13) and checks if all copies for which permission has been given are reported as finished (S14). If so, the job is done and the server function ends the process (S15). If in step S14 not all permitted copies have been reported as finished, the server function checks if a printer breakdown has been reported (S16), because in that case the copy that printer was printing will never be finished. If no breakdown has been reported, the server function returns to step S14, and in doing so enters a waiting loop until all copies have been finished. If in step S16 a printer breakdown is detected, the server function withdraws the permission given to the broken-down printer (S17) and returns to step S10. Since the withdrawal of the permission of the broken-down printer decreases the number of given permissions, there is now room for another printer to print the associated copy.

Figure 16:
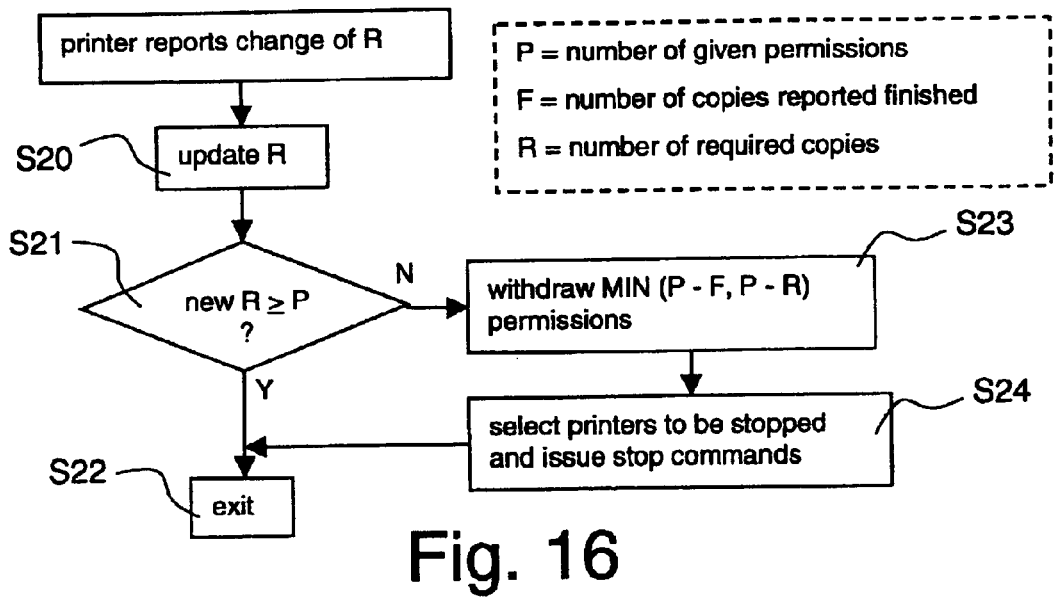

FIG. 16 is a diagrammatic representation of the procedure followed by the server function, when an operator changes the required number of copies (R) at the operating panel of any of the active printer during the processing of a tandem print job. The JobManager 12 of the printer reports the changed number of copies needed to the server function and the other involved printers, e.g. by broadcasting, and in reaction, the server function updates accordingly the required number of copies in memory (S20). Then, it checks if the new number (R) is greater than or equal to the total number of permissions (P) to start printing a copy, having been given at that moment (S21). If so, the procedure ends (S22), because no special action has to be taken. However, if the number of permissions is already greater than the new required number of copies, then the distributed printing process will deliver too many copies, and action is taken to limit the number of excessive copies or print sheets. For example, the server function withdraws as many permissions as is necessary to prevent the number of finished copies from surpassing the new required number of copies (S23) if such is still possible. This number is found by using a calculation according to the following formula:

$$N_w = \text{MIN}\,(P-F,\ P-R)$$

wherein:
$N_w$=number of permissions to be withdrawn
P=number of given permissions
F=number of copies reported as finished
R=(new) number of required copies.

On the basis of this number $N_w$, the server function selects printers to be stopped. If not all printers have to be stopped, the server function selects printers having received the most recent permissions and orders them to stop as soon as possible (S24), such that the number of print sheets produced in excess are minimized. Then, the server function exits the procedure (S22).

The above mechanism can also be used for stopping all involved printers at once, e.g. when an error in the document to be printed has been detected. To do so, the required number of copies must be changed to 0 (zero). In reaction, all printers are stopped by the server function. This may also be done from a printer that is not yet involved in the tandem job, simply by selecting the relevant print job, setting the required number of copies to 0 and "starting" the printer by actuating the start key 61 or other designated key.

After a tandem job has been printed, a list of involved printers and the number of copies printed by each of the printers may be printed on a request made by the operator, for instance by actuating one of the keys 64A-64E designated for this purpose with an appropriate caption on the display screen 60. The server function has all necessary data for drawing up such a list and can easily make it upon request.

Especially for small print jobs and high numbers of copies, there is much communication between the server function and the printers, and network loading is high. This can be lowered by giving permissions for printing a specified number of copies at once, e.g. blocks of 5 copies.

A special form of a print file is an image or a series of images generated by scanning documents in a scanner, such as the scanner of any of the digital copiers used as printers in the description above. In a variant of the present invention, also scanned images are included in the list of print files made available for selection and printing on the connected printers. Such scanned files may be identified by the term "copy job" and an identification of the copier on which the scan file was made and the time of scanning. If an accounting is active, then the account name may be used for identification of the scan file. Such scanned print files are expressly included in the present invention.

The processing steps and the computer programs of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device such as a printer or server.

The invention being thus described, it will be obvious that the same may be varied in many ways. Such variations and modifications as would be obvious to one skilled in the art are intended to be included within the scope of the following claims.

What is claimed is:

1. A method of printing digital print files in a network system including a print service and a plurality of printers, wherein a digital print file includes print image data and metadata specifying job information including a required number of copies to be printed, and wherein at least one of the printers is provided with a local memory and a local operator control unit with an inputting unit and a display and is adapted for permitting interactive printing, the interactive printing representing printing a print file only upon selection of that print file and entering a print command through the operator control unit, the method comprising:

a first step of, by the print service, receiving print files, storing the received print files in a storage, and distributing information on the stored print files, including metadata, to a plurality of the printers; and a second step of starting a print process for a first print file in one of the printers and, while said print process is active, starting an interactive print process for the first print file in another one of the printers, wherein the print service controls the printers processing said first print file to print together a total number of copies of the first print file, which is equal to the required number of copies specified in the metadata of said print file.

2. The method according to claim 1, wherein said first step comprises:

receiving a print file at the print service;

storing said print file in a storage;

extracting, by the print service, at least part of the metadata of said print file;

transmitting, by the print service, said extracted metadata to a plurality of the printers; and receiving said metadata by said plural printers and providing said metadata to a local file selection mechanism resident in the operator control units of each of said plural printers.

3. The method according to claim 1, wherein the printers printing said first print file report the finishing of each copy of said first print file to the print service, and obtain permission from the print service for starting printing of each new copy of the first print file, and wherein the print service gives said permission with reference to the number of copies contained in the metadata of said first print file.

4. The method according to claim 1, further comprising:

in reaction to a selection by an operator at a printer, fetching the print data of the selected print file from the storage and printing the selected print file.

5. The method according to claim 1, further comprising:

communicating status changes of a print file to all printers which have the associated metadata.

6. The method according to claim 5, wherein a status change of a print file is reported, by a printer in which said status change takes place, to the print service, and wherein the print service communicates the reported status change to the printers that have the associated metadata.

7. The method according to claim 5, further comprising:

updating local print selection mechanisms of the printers in accordance with reported status changes of print files.

8. The method according to claim 5, wherein the status changes include starting a print process for a copy of the print file, finishing a print process for a copy of the print file, deleting the print file, and changing the required number of copies by an operator by using the operator control unit of a printer.

9. The method according to claim 1, further comprising:

maintaining, by the print service, a list of all print files in the system, including the metadata of said files.

10. The method according to claim 1, wherein said print service is implemented as a server connected to a network.

11. The method according to claim 1, wherein each connected printer is provided with a server process that is logically connected to the server processes in the other printers, and wherein the server processes together form a distributed print service.

12. The method according to claim 1, wherein a print file for coordinated concurrent processing in at least two of the printers includes a metadata item identifying the coordinated concurrent processing.

13. A printing system for printing digital print files, wherein a digital print file includes print image data and metadata specifying job information including a required number of copies to be printed, the system comprising:

a plurality of printers, each being provided with a local memory, a local operator control unit provided with an inputting unit and a display and including a file selection mechanism adapted for interactive printing, the interactive printing representing printing a print file only upon selection of that print file and entering a print command through the operator control unit;

a print service being adapted to receive print files, to store the received print files in a storage, and to distribute information on the stored print files, including metadata, to the plurality of the printers; and a network for interconnecting the printers, the print service and one or more personal workstations, wherein the print service is adapted to permit starting a print process for a first print file in one of the printers and, while said print process is active, starting an interactive print process for the first print file in another one of the printers, and the print service is adapted to control the printers processing said first print file to print together a total number of copies of the first print file, which is equal to the required number of copies specified in the metadata of said print file.

14. The system according to claim 13, wherein said print service includes:

a reception module for receiving a print file;

a storage for storing said print file;

an extraction module for extracting at least part of the metadata of said print file; and a transmission module for transmitting said extracted metadata to the plurality of the printers.

15. The system according to claim 13, wherein the operator control unit of a printer includes a communication module for reporting the finishing of each copy of a print file to the print service and obtaining permission from the print service for starting printing of each new copy of said print file.

16. The system according to claim 13, wherein each of the printers further comprises:

a fetch module for fetching print data of a print file selected by an operator at a printer, from the storage of the print file.

17. The system according to claim 13, wherein the print service further includes:

a communication unit for communicating status changes of a print file to all printers which have the associated metadata.

18. The system according to claim 17, wherein the status changes include starting a print process for a copy of the print file, finishing a print process for a copy of the print file, deleting the print file, and changing the required number of copies by an operator by using the operator control unit of a printer.

19. The system according to claim 13, wherein said print service is implemented as a server connected to the network.

20. The system according to claim 13, wherein each connected printer is provided with a server process that is logically connected to the server processes in the other printers, and wherein the server processes together form a distributed print service.

21. A computer program product embodied on at least one computer-readable medium accessible by a computer, for printing digital print files in a network system including a print service and a plurality of printers, wherein a digital print file includes print image data and metadata specifying job information including a required number of copies to be printed, and wherein at least one of the printers is provided with a local memory and a local operator control unit with an inputting unit and a display and is adapted for permitting interactive printing, the interactive printing representing printing a print file only upon selection of that print file and entering a print command through the operator control unit, the computer program product comprising computer-executable instructions for:

by the print service, receiving print files, storing the received print files in a storage, and distributing information on the stored print files, including metadata, to a plurality of the printers; and starting a print process for a first print file in one of the printers and, while said print process is active, starting an interactive print process for the first print file in another one of the printers, wherein the print service controls the printers processing said first print file to print together a total number of copies of the first print file, which is equal to the required number of copies specified in the metadata of said print file.

* * * * *